Figures 1, 2, 3:
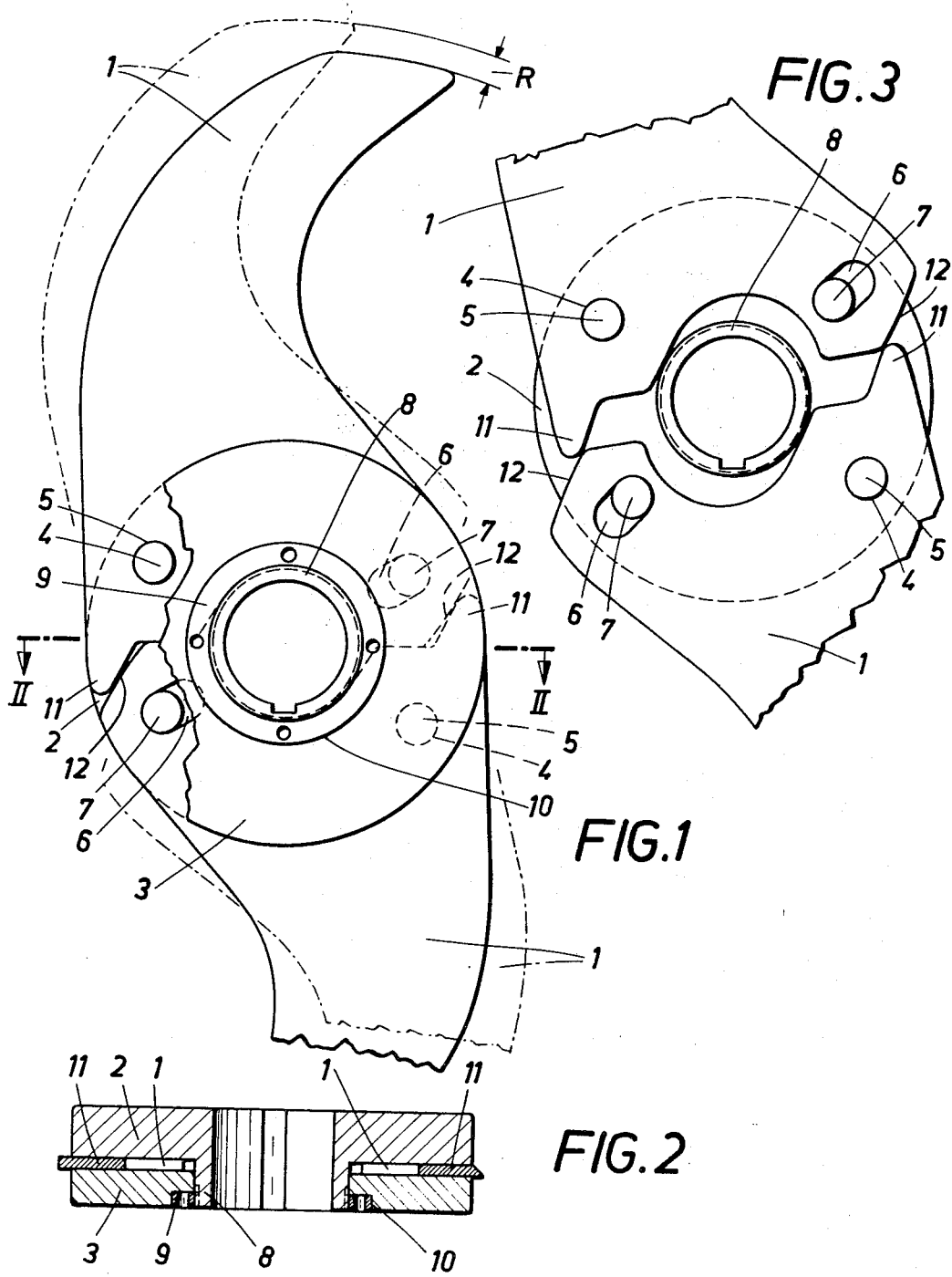

United States Patent

[11] 3,631,907

| | | | |
|---|---|---|---|
| [72] | Inventor | Friedrich Laska Holzstrasse 4, Linz, Austria | |
| [21] | Appl. No. | 742,073 | |
| [22] | Filed | July 2, 1968 | |
| [45] | Patented | Jan. 4, 1972 | |
| [32] | Priority | July 12, 1967 | |
| [33] | | Austria | |
| [31] | | A 6501/67 | |

[54] CUTTER HEAD FOR USE IN MEAT GRINDERS
4 Claims, 3 Drawing Figs.

[52] U.S. Cl. .................................................. 146/106,
146/67, 146/96
[51] Int. Cl. ..................................................... B26d 1/28,
A23p 1/00
[50] Field of Search ........................................ 146/67,
106, 96; 29/105; 51/288; 241/192

[56] References Cited
UNITED STATES PATENTS

| 3,491,818 | 1/1970 | Schaller | 146/96 |
|---|---|---|---|
| 2,664,128 | 12/1953 | Braunwalder et al. | 146/106 |
| 939,773 | 11/1909 | Williams | 241/192 |
| 1,888,895 | 11/1932 | Verkuil | 29/105 X |

FOREIGN PATENTS

| 418,873 | 2/1967 | Switzerland | 146/67 |
|---|---|---|---|

Primary Examiner—Andrew R. Juhasz
Assistant Examiner—Z. R. Bilinsky
Attorney—Kurt Kelman ABSTRACT: The cutter head comprises a plurality of self-contained units, which are individually removable. Each of said units comprises a retaining disc, a clamping disc and at least two cutter teeth clamped between said retaining and clamping discs and disposed in one plane. The clamping disc is adapted to release said teeth. Each of said teeth when thus released is movable relative to said discs for an adjustment of the circular orbit of the tooth. Each unit further comprises coupling means arranged to constrain said teeth of each unit to move equally in unison relative to said discs.

PATENTED JAN 4 1972 3,631,907

INVENTOR.
FRIEDRICH LASKA
BY Kurt Kelman
AGENT

CUTTER HEAD FOR USE IN MEAT GRINDERS

This invention relates to a cutter head, which is intended for use in meat-comminuting devices and comprises a plurality of cutter teeth, which are adjustable to vary the radius of their circular orbits. A known cutter head of this kind comprises an externally hexagonal sleeve, which is slidable onto the shaft of the cutter head and which carries the individual cutter teeth having forked roots with intervening spacers, which teeth are axially clamped by nuts. In this cutter head, the cutter teeth can be individually adjusted radially for adaptation to the form of the revolving annular bowl, but the teeth are disposed one behind the other in the direction of the shaft of the cutter head so that there is only one tooth in each tooth plane that is normal to the axis and there is no balance of weight and mass within these tooth planes. Owing to its rotary unbalance, such cutter head gives rise to vibration and an unsteady operation of the machine, particularly at high speeds of the cutter head shaft. When the cutter head is to be enlarged by an addition of teeth or to be reduced in size by a removal of individual teeth, all teeth lose their preadjusted positions and must be readjusted. This readjustment is time consuming and difficult.

Another known cutter head comprises a plurality of cutter teeth, which are disposed between an intermediate retaining disc and two lateral clamping discs. The teeth on each side of the intermediate retaining disc lie in one plane, each tooth is mounted on two pins, which are anchored in the retaining disc, and radial edges of the roots of adjacent teeth are contiguous. Whereas such a cutter head has a considerable degree of rotary balance, it is not possible to selectively use only one cutter head or two or more identical cutter heads arranged one behind the other, as may be required, because the teeth are fixed rather than adjustable and the annular bowl of the meat grinder, which has the form of a segment of a circle in cross section, requires a change in the radii of the circular orbit of the teeth when the cutter head is axially extended.

It is an object of the invention to eliminate all these disadvantages and to provide a cutter head which is intended for use in meat-comminuting devices and has a high degree of rotary balance so that it ensures a smooth operation of the machine even at high speeds and which can easily and quickly be altered as to the number of acting teeth.

Based on a cutter head which is intended for use in meat-comminuting devices and comprises a plurality of cutter teeth which are adjustable to vary the radius of their circular orbits, the invention is essentially characterized in that the cutter head is composed of individually removable, self-contained units, which consist each of at least two cutter teeth, which are disposed in a plane and clamped between a retaining disc and a clamping disc, and the cutter teeth of each of said units are pivotally and slidably mounted and coupled for being adjusted in unison. As the cutter head is composed of self-contained, removable units, it can be enlarged by an addition of units or decreased in size by a removal of such units as may be required. The resulting structure has rotary balance because each unit comprises teeth which lie in a plane that is normal to the axis and which balance each other as to weight and mass so that there will be no rotary unbalance even when a plurality of such units are arranged one behind the other. A plurality of units can only be assembled to form a cutter head if the cutter teeth are adjustable for adaptation to the respective radii of the annular bowl of the meat-comminuting device. The fact that the teeth of each unit are coupled for being adjusted in unison assures that the adjustment will not create rotary unbalance and facilitates also the adjustment as such. As the units are self-contained, the cutter teeth of each unit will remain in their adjusted position when the cutter head is taken apart or assembled so that it is not necessary to readjust all teeth in each case.

A particularly simple and desirable design of the means for mounting and adjusting the cutter teeth will be obtained if each of the mutually identical cutter teeth is pivoted to the associated retaining disc by a pin and a circular hole and is coupled to the rotationally adjustable clamping disc by a second pin, which extends into an approximately radial slot. For this reason, a rotation of the clamping disc will vary the peripheral distance between the two pins so that the teeth will be pivotally moved and the second pin will be displaced in the slot. A pivotal movement of the teeth will change the radius of the circular orbit of the tip of the tooth for adaptation to the respective inside radius of the annular bowl.

Each retaining disc has an axially extending hub on which the clamping disc is rotatably and axially slidably fitted and which carries an external screw thread for a circular nut, which is accommodated in a recess of the clamping disc. When the circular nut is loosened, the clamping disc is released for a rotation to adjust the teeth. When the teeth are in the desired position, the circular nut is tightened so that the teeth are frictionally retained in their adjusted position. The teeth are thus held in their position until all units are gripped on the cutter head shaft.

According to one aspect of the invention, each cutter tooth has at its root on one side a nose, which protrudes toward the opposite tooth, and on the other side a bevel, and the nose contacts the bevel of the opposite tooth and during the adjustment of the teeth slides along said bevel so that the adjusted teeth will not define between themselves a gap, which could easily be soiled.

The invention is illustrated by way of example on the accompanying drawing, in which FIG. 1 is an elevation showing a unit of a cutter head, FIG. 2 is a sectional view taken on line II—II in FIG. 1, and FIG. 3 an elevation showing the central portion of the unit with the clamping disc removed and the teeth in a different position.

The cutter head is not shown in its entirety and consists of a plurality of like units, which can be assembled one behind the other and clamped together on the cutter shaft in any desired number and sequence and can be individually removed. Each of these units comprises two cutter teeth 1, which are clamped between a retaining disc 2 and a clamping disc 3. Each tooth 1 is formed with a circular hole 4, by which it is pivoted on a pin 5 of the retaining disc 2. Each tooth has on its other side an approximately radial slot 6, which receives a pin 7 that protrudes from the clamping disc 3. The retaining disc has an axially extending hub 8, which is formed with external screw threads threaded into a circular nut 9. The latter is accommodated in a recess 10 of the clamping disc 3.

When the circular nut 9 has been loosened and the clamping disc 3 is rotated in the counterclockwise sense from the position shown in FIG. 1, the teeth 1 will be pivotally moved in the same direction and the pins 7 will move relatively inwardly in the slots 6 until the position shown in FIG. 3 is reached, which corresponds to the tooth position indicated in dash-dot lines in FIG. 1. The pivotal movement results in a change of the radius of the circular orbit of the tooth by the distance R. Alternatively, the pin 5 could be fixed to the tooth 1 and be rotatably mounted in a bore of the retaining disc 2, and/or the pins 7 could be provided on the teeth 1 and the slots 6 in the clamping disc 3.

Each tooth 1 has at its root a nose 11, which projects toward the opposite tooth, and on the other side a bevel 12. The nose and the bevel of mutually opposite teeth contact each other and slide along each other during an adjustment of the teeth.

What is claimed is:

1. A cutter head in a meat-comminuting device, said cutter head having an axis of rotation and comprising individually removable cutter units, each unit including
   1. a retaining disc,
   2. a clamping disc,
      a. the discs being coaxially mounted along the axis of rotation and defining therebetween a gap perpendicular to said axis,
   3. two coplanar cutter teeth in said gap and extending radially from said axis, the cutter teeth being symmetrical in respect of the axis for balance during rotation and having cutter edges moving in a circular orbit about said axis upon rotation, b. the cutter teeth being clamped between and in contact with the discs, and 4. releasable coupling means on the teeth and one of the discs for respectively holding the teeth clamped between the discs in a selected circular orbit, and for pivotally adjusting the teeth in unison relative to said retaining disc into another selected position wherein the cutter edges move in another selected circular orbit, the coupling means including c. a fixed pivot for pivoting each of said cutter teeth on the retaining disc, the fixed pivots of the two teeth being diametrically opposite each other, and d. a sliding pivot for adjustably sliding each of said cutter teeth in respect of the retaining disc, the sliding pivots of the two teeth being diametrically opposite each other, the four pivots of the two teeth forming a rectangle whereby each tooth may slide along the sliding pivot while being pivoted about the fixed pivot thereof.

2. The cutter head of claim 1, wherein each fixed pivot consists of a pivot pin extending from the retaining disc in the direction of the axis and a circular hole in the associated tooth rotatably engaging the pivot pin, each sliding pivot consists of a pivot pin extending from the clamping disc in the direction of the axis and a substantially radially extending slot in the associated tooth slidably engaging the latter pin, and the coupling means further includes means for rotating the clamping disc in respect of the retaining disc about the axis.

3. The cutter head of claim 1, wherein the rotating means includes an externally threaded hub projecting from the retaining disc into a coaxial annular recess in the clamping disc, and a nut threadedly mounted in the recess on the hub whereby loosening of the nut enables the clamping disc to be rotated and axially moved in respect of the retaining disc on the hub of the retaining disc.

4. The cutter head of claim 1, wherein each cutter tooth has a root portion adjacent the pivots of the tooth, the root portion includes a nose adjacent one of the pivots and protruding toward the other tooth, and a bevel adjacent the other pivot and engaging the nose of the other tooth, the noses and bevels of the teeth being in sliding engagement when the cutter teeth adjustably slide along their sliding pivots.

* * * * *